US012761468B2

(12) United States Patent
Tozburun

(10) Patent No.: US 12,761,468 B2
(45) Date of Patent: Oct. 13, 2026

(54) SYSTEM AND METHOD USING SURFACE SCANNING PATTERN/PROTOCOL BASED ON MODIFIED ELECTRICAL WAVES TO PRODUCE A WIDE AND DYNAMIC TIME INTERVAL BETWEEN SCANS

(71) Applicant: IZMIR BIYOTIP VE GENOM MERKEZI, Izmir (TR)

(72) Inventor: Serhat Tozburun, Izmir (TR)

(73) Assignee: IZMIR BIYOTIP VE GENOM MERKEZI, Izmir (TR)

( * ) Notice: Subject to any disclaimer, the term of this patent is extended or adjusted under 35 U.S.C. 154(b) by 386 days.

(21) Appl. No.: 18/274,205

(22) PCT Filed: Jan. 11, 2022

(86) PCT No.: PCT/TR2022/050017
§ 371 (c)(1),
(2) Date: Jul. 25, 2023

(87) PCT Pub. No.: WO2022/164408
PCT Pub. Date: Aug. 4, 2022

(65) Prior Publication Data

US 2024/0085691 A1 Mar. 14, 2024

(30) Foreign Application Priority Data

Jan. 26, 2021 (TR) ................................ 2021/01197

(51) Int. Cl.
*G02B 26/10* (2006.01)
*G01N 21/41* (2006.01)
(Continued)

(52) U.S. Cl.
CPC .......... *G02B 26/101* (2013.01); *G01N 21/41* (2013.01); *G02B 26/128* (2013.01); *G01N 2021/1757* (2013.01); *G01N 2021/418* (2013.01)

(58) Field of Classification Search
None
See application file for complete search history.

(56) References Cited

U.S. PATENT DOCUMENTS 10,136,865 B2 11/2018 Rousso et al.
10,281,256 B2 5/2019 Cable et al.
(Continued)

FOREIGN PATENT DOCUMENTS

EP 2054712 5/2009
JP 2016041218 3/2016
(Continued)

OTHER PUBLICATIONS

V.F. Duma, K.S. Lee, P. Meemon and J.P. Rolland, "Experimental investigations of the scanning functions of galvanometer-based scanners with applications in OCT," Appl. Opt. 50(29), 5735-57 49 (2011).

(Continued)

*Primary Examiner* — Paisley L Wilson
(74) *Attorney, Agent, or Firm* — Crose Law LLC; Bradley D. Crose

(57) ABSTRACT

A method of data acquisition and image generation over a wide and dynamic time interval between surface scans using modified electrical waves is disclosed. It is also disclosed that generating altered electrical waveforms that drive a scanner using conventional waves such as sinusoidal or triangle or sawtooth can enhance the method. Systems for A-scan, B-scan, and C-scan imaging include surface scan setups using a one-dimensional and a two-dimensional scan-
(Continued)

ner, respectively. Three different arrangements of conventional waves enable modified waveforms that drive scanners to produce a wide and dynamic interscans time interval on both the fast and slow scan axes. (i) At a constant peak-to-peak voltage, the instantaneous voltage of the electrical sinusoidal wave shifts in time with the amplitude of the electrical signal in the ramp waveform within a range. (ii) The frequency of a waveform continuously increases (up-chirp) as a function of time in the form of a positive ramp sawtooth or continuously decreases as a function of time in the form of a negative ramp sawtooth. (iii) The frequency of a waveform is modulated as a function of time in a 90-degree phase retarded sinusoidal form within a deviation range of the +/−peak frequency.

36 Claims, 18 Drawing Sheets

(51) Int. Cl.

| | |
|---|---|
| ***G02B 26/12*** | (2006.01) |
| *G01N 21/17* | (2006.01) |

(56) References Cited

U.S. PATENT DOCUMENTS

| | | | | |
|---|---|---|---|---|
| 10,839,568 | B2 | 11/2020 | Ashok et al. | |
| 2014/0028997 | A1 * | 1/2014 | Cable | H01S 5/18361 356/51 |
| 2015/0233701 | A1 | 8/2015 | Hogan | |

FOREIGN PATENT DOCUMENTS

| | | |
|---|---|---|
| TR | 2018/10000 | 8/2018 |
| WO | 2005031320 | 4/2005 |

OTHER PUBLICATIONS

V. F. Duma, P. Tankam, J. Huang, J. Won and J. P. Rolland, “Optimization of galvanometer scanning for optical coherence tomography,” Appl. Opt. 54(17), 5495-5507 (2015).

A. Szkulmowska, M. Szkulmowski, D. Szlag, A. Kowalczyk and M. Wojtkowski, “Three-dimensional quantitative imaging of retina! and choroidal blood flow velocity using joint Spectral and Time domain Optical Coherence Tomography,” Opt. Express 17(13), 10584-10598 (2009).

P. Meemon and J. P. Rolland, “Swept-source based, single-shot, multidetectable velocity range Doppler optical coherence tomography,” Biomed. Opt. Express 1 (3), 955-966 (2010).

M. J. Ju, M. Heisler, A. Athwal, M. V. Sarunic and Y. Jian, “Effective bidirectional scanning pattern for optical coherence tomography angiography,” Biomed. Opt. Express 9(5), 2336-2350 (2018).

Oh “High dynamic range optical coherence tomography angiography (HOR-OCTA),” Opt. Express 10(7), 3560-3571 (2019).

L. Shi, J. Qin, R. Reif and R. K. Wang, “Wide velocity range Doppler optical microangiography using optimized step-scanning protocol with phase variance mask,” J Biomed Opt. 18(10), 106015 (2013).

S. B. Planer, E. M. Moult, W. Choi, N. K. Waheed, B. Lee, E. A. Novais, E. D. Cole, B. Potsaid, L. Husvogt, J. Schottenhamml and J. G. Fujimoto, “Toward Quantitative Optica Coherence Tomography Angiography: Visualizing Blood Flow Speeds in Ocular Pathology Using Variable Interscan Time Analysis,” Retina 36, S | 18-SI26 (2016).

F. Jaillon, S. Makita and Y. Yasuno, “Variable velocity range imaging of the choroid with dual-beam optical coherence angiography,” Opt. Express 20( 1 ), 385-396 (2011).

S. Kim, T. Park, S.J. Jang, A.S. Nam, B.J. Vakoc and W.Y. Oh, “Multi-functional angiographie OFDI using frequency-multiplexed dual-beam illumination,” Opt. Express 23(7), 8939-8947 (2015).

T. Park, S.J. Jang, M. Han, S. Ryu, and W.Y. Oh, “Wide dynamic range high-speed three-dimensional quantitative OCT angiography with a hybrid-beam scan,” Optics Lett. 43(1 O), 2237-2240 (2018).

Xiang Wei; Tristan T. Hormel; Shaohua Pi; Yukun Guo; Yifan Jian; and Yali Jia “High dynamic range optical coherence tomography angiography (HOR-OCTA),” Opt. Express 10(7), 3560-3571 (2019).

Grulkowski, 1. Gorczynska, M. Szkulmowski, D. Szlag, A. Szkulmowska, R.A. Leitgeb, A. Kowalczyk and M. Wojtkowki “Scanning protocols dedicated to smart velocity ranging in Spectral OCT,” Opt. Express 17(26), 23736-23754 (2009).

W. Choi, E. M. Moult, N. K. Waheed, M. Adhi, B. Lee, C. D. Lu, E. Talisa, V. Jayaraman, P. J. Rosenfeld, J. S. Duker and J. G. Fujimoto, “Ultrahigh-speed, swept-source optical coherence tomography angiography in nonexudative age-geographic related macular degeneration with atrophy,” Ophthalmology 122(12), 2532 (2015).

* cited by examiner

SYSTEM AND METHOD USING SURFACE SCANNING PATTERN/PROTOCOL BASED ON MODIFIED ELECTRICAL WAVES TO PRODUCE A WIDE AND DYNAMIC TIME INTERVAL BETWEEN SCANS

TECHNICAL FIELD

The present invention relates to a system and method that uses configurable surface scan patterns/protocols to collect data, generate images and provide therapeutic photo-thermal damage in a wide and dynamic time interval between one-way or two-way scans from a target surface with a light beam.

In particular, the invention relates to a system and method that provides a wide and dynamic time interval between scans in both fast and slow scan axes by operating a scanner with altered electrical waveforms, for example, a waveform obtained by varying the direct current (DC) offset voltage of a sinusoidal signal linearly in time; up-chirp or down-chirp waveforms; and frequency-modulated waveforms.

BACKGROUND ART

The term dynamic range is defined as the largest and smallest amount ratio, especially in engineering. The dynamic range of an imaging system is defined by its ability to measure the minimum and maximum data over time. For example, in photography, an image with a wide dynamic range can be obtained by merging long and short exposures, that is, an image with different exposure times. In short, this technique is also called wide dynamic range photography via multiple exposures.

In a similar approach, short-term measurements can be made to detect/image/measure rapid displacements (fast flows), while long-term measurements can be made for slow displacements (slow flows). This concept can be used in specific medical applications such as detecting/imaging/measuring blood flow in a vessel, i.e., displacement of blood cells. Imaging techniques such as Optical Coherence Tomography (OCT) angiography and Doppler-OCT are emerging technologies to detect/image/measure blood flow. In these tomography technologies, target tissue imaging is performed in formats such as A-scan (one-dimensional, depth scan), B-scan (two-dimensional, cross-sectional scan), and C-scan (three-dimensional scan). The time difference between scans, the scan interval, is similar to multiple exposures in photography. In other words, a short scan interval is used to detect/image/measure fast blood flow, while a long scan interval is used for slow blood flow.

On the other hand, functionally, vessels can have different diameters and therefore different blood flow rates. However, with a fixed scanning time interval, all vessels carrying blood at different velocities can be detected/imaged/measured at the same rate level. For example, in the case of a fixed, relatively short scan time interval, the detectable/displayable/measurable sensitivity to slow blood flow is reduced because red blood cells are not given sufficient time to allow them to travel far in the vessel.

For these reasons, blood flow needs to be detected/displayed/measured at multiple time intervals to take advantage of emerging technologies such as OCT angiography and Doppler-OCT in more comprehensive medical applications. This challenge can be overcome with a wide and dynamic range of scanning rates. Various surface scanning models/protocols have been proposed to produce a wide and dynamic range of scanning rates.

One of the protocols is the traditional raster-type scanning pattern, which is generally studied for sawtooth, sinusoidal, and triangular waves [1,2]. However, in the case of a unidirectional scan (forward scan or reverse scan only), the time interval between B scans, which consists of many one-dimensional depth scans (i.e., A-scans), is fixed and does not change over time. On the other hand, in the case of the bidirectional raster scan, the time interval between two consecutive B-scans changes proportionally or inversely with the A-scan index. However, only fixed time interval vessel detection/imaging/measurement can be performed using sequential B-scan conventional image processing algorithms. In another proposed surface scan model [3], multiple time intervals can be obtained by applying spatial oversampling along each scan to achieve a wide and dynamic range between scans. Oversampling improves image quality by increasing the signal-to-noise ratio; however, it increases the overall acquiring time as a bottleneck. In other words, the imaging speed drops.

Another model is proposed that a wide velocity range measurement can be performed using a step-scan strategy in the fast axis and repeated A-scan at each step of the square wave [4]. Additionally, bidirectional scanning can double the speed using the rotation required to return the scanner to its original position with square waves [5,6]. However, the scanning mirror takes time to move from one step to the next and snap into place due to its mechanical inertia. Therefore, the correlation between any two A-scans at each step is highly dependent on the mechanical properties of the scanner used. On the other hand, a triggering method is provided to reduce the dependence on the mechanical property of the scanning mirror [7]. However, in some cases, the whole system becomes even more complex.

In another suggestion [8], the scanning method works based on segmented, i.e., stepped, sawtooth function. By adjusting the length of the sawtooth scan section, multiple time-interval detection/imaging/measurement is provided. However, the difference between the multiple time intervals produced by the protocol needs to be set relative to the expected velocity ranges in the field of view. The possibility of employing uncorrelated signals with multiple time-interval for quantified flow rate measurements can be demonstrated [9,10]. However, the quasi-numerical measurement with a limited dynamic range and the inability to apply isotropic resolution should have restrictions.

The time interval between successive scans is determined by the physical separation (distance) between the simultaneous dual laser beams in the scanning protocol [11,12]. In this way, sub-millisecond time intervals are produced, providing a wide dynamic speed range. However, the optics producing the physical separation of the two imaging beams must be manually realigned each time to adjust the time interval. Manual alignment inevitably slows down the imaging speed. Moreover, a long-distance separation between the two laser beams is required to detect/image/measure slow blood flow. Combining the dual-beam scanning protocol and the single-beam scanning protocol between B-scans allows the simultaneous acquisition of multiple images at multiple time intervals [13]. However, the relative part of the correlated signal initiated by the non-translational motion should not be neglected for slow flow measurements, which results in overestimated blood flow rates in capillaries.

Accordingly, given current surface scanning models and approaches, at least some of the challenges/limitations described above need to be addressed.

The patent file "TR2018/10000", which shares state of the art, has been reviewed. In the revised invention, multiple first OCT cross-sectional images are recorded to generate an OCT, each first cross-sectional image representing a different slice of an object. A reference shape representing the three-dimensional contour of at least one structural element of the object in a given three-dimensional coordinate system (x, y, z) is detected by feature recognition of at least one structural element in the first section images. The multiple second-OCT 2D views are then recorded to represent a different cross-section of the object. Finally, three-dimensional OCT images are generated from feature-overlapping second section images.

Reviewing the existing methods: the invention, the subject of the patent numbered "U.S. Pat. No. 10,839,568B2" in state of the art, relates to creating a de-warped B-scan image from a corresponding cropped OCT A-scans. It is critical to perform linear optical sampling based on the OCT imaging modality. Due to the inertial responses of the motor, some types of scanners (for example, non-resonant galvo-scanner) may not be able to respond to the high-frequency components at the turning points of such waveforms. Thus, A-scans obtained at constant surface scanning frequency in both cases (sawtooth or sinusoidal) correspond to positions not evenly distributed over the sample's surface. This uneven sampling can introduce a horizontal wrapping artifact in the B-scan image (i.e., cross-sectional image). This invention proposes a computer-implemented method for correcting warping artifacts caused by conventional sinusoidal and sawtooth waveforms, which generates a look-up table associating each of a plurality of pixel arrays.

A review of existing devices should note that the subject of the patent number "EP2054712A2" in state of the art relates to an apparatus used to enhance OCT imaging modality to be used as a diagnostic technique potentially. In several clinical applications, the diagnostic use of traditional OCT techniques is limited due to the misleading effect of speckle noise. This invention proposes to reduce the OCT limiting speckle noise with an asymmetric volumetric median filtering and a pulsating surface scanning pattern. Three different vibratory surface scanning models are offered as sinusoidal, spiral, and diagonal. However, the time interval between consecutive cross-sectional and volumetric data obtained with these models is fixed.

Still reviewing the existing devices and systems: the subject of the patent numbered "US20150233701A1" in state of the art is related to a method, apparatus, and system for improving measurement and imaging by OCT in combination with mechanical (ultrasound) waves. OCT imaging modality has the potential for measuring glucose concentration due to improvements in signal-to-noise ratios. However, there are still problems with improving signal-to-noise ratios. The present invention proposes to reduce the OCT limiting speckle noise by applying a pressure or ultrasound wave to the target tissue. Speckle noise is randomized by varying the optical path lengths between optical scatterers in the target tissue to which a pressure or ultrasound wave is applied, thus reducing the speckle noise by averaging. However, the time difference between successful surface scans is fixed to a value.

Another review of the existing devices and systems should report that the patent numbered "U.S. Pat. No. 10,136,865B2" in state of the art relates to a system and method for detecting and measuring non-random radioactive emission in nuclear imaging (for example, positron emission tomography-PET or single-photon emission computed tomography-SPECT). Nuclear imaging is still open to improvements in several aspects, including speed, spatial resolution, spectral resolution, and sensitivity. The invention proposes a radio imaging camera characterized by high sensitivity and algorithms that can work with the camera. The camera uses conventional scanning patterns and is characterized by a half-angle phase shift based on reverse scanning. However, the time interval between scans provides a constant rate.

Considering the challenges and the inadequacy of existing methods, devices, and systems mentioned above, new approaches and technologies are needed in the relevant technical field.

SUMMARY OF INVENTION

The present invention relates to configurable surface scan patterns/protocols to collect data, generate images and provide therapeutic photo-thermal damage in a wide and dynamic interscan time interval from a target surface with a light beam. Specifically, the present invention relates to various arrangements of conventional waves that enable modified waveforms to produce such surface scan patterns/protocols on both the fast and slow scan axes.

The waveform embodiment of the present invention are listed, but are not limited to, as follows: (i) At a constant peak-to-peak voltage, the instantaneous voltage of the electrical sinusoidal wave shifts in time with the amplitude of the electrical signal in the ramp waveform within a range. (ii) The frequency of a waveform continuously increases (up-chirp) as a function of time in the form of a positive ramp sawtooth or continuously decreases as a function of time in the form of a negative ramp sawtooth. (iii) The frequency of a waveform is modulated as a function of time in a 90-degree phase retarded sinusoidal form within a deviation range of the +/−peak frequency.

The advantages and innovations of the present invention over state of the art can be summarized as follows: the present invention discloses configurable waveforms generated by conventional waves such as sinusoidal or triangular or sawtooth for surface scan patterns/protocols that provide wide and dynamic interscan time intervals. The proposed surface scan patterns/protocols can be applied to acquire data, create images, and provide therapeutic photo-thermal injury, including ablation and coagulation. The scanning mirror is operated on both fast and slow scanning axes with electrical signals based on various modified waveform arrangements of the present invention. Thus, this produces a wide and dynamic time interval between B-scans or C-scans or both in 3D imaging modalities such as Optical Coherence Tomography. The invention proposes effective surface scan patterns/protocols employed in imaging techniques such as Optical Coherence Tomography Angiography and Doppler Optical Coherence Tomography to detect/image/measure blood flow or blood vessel structures. Besides, rapid changes (e.g., fluorescence recovery after photobleaching) during superficial imaging models such as laser scanning confocal microscopy or changes at different speeds in in-vivo imaging are detected/imaged/measured.

BRIEF DESCRIPTION OF DRAWINGS

The following are descriptions of the accompanying figures showing illustrative embodiments of the present disclosure that clearly explain the objects, features, and advantages of the invention.

DESCRIPTION OF EMBODIMENTS

In order to increase the comprehensive impact of surface scanning data acquisition and imaging techniques in diagnostic applications and preclinical studies, it is necessary to simultaneously detect/image/measure multiple time interval changes (for example, blood flow rates). The techniques include, but are not limited to, Optical Coherence Tomography (OCT), OCT-angiography, Doppler-OCT, and laser scanning confocal microscopy. This challenge can be overcome by creating a wide and dynamic range of surface scanning rates in blood flow and angiography detection/imaging/measurement.

Figure 1A:
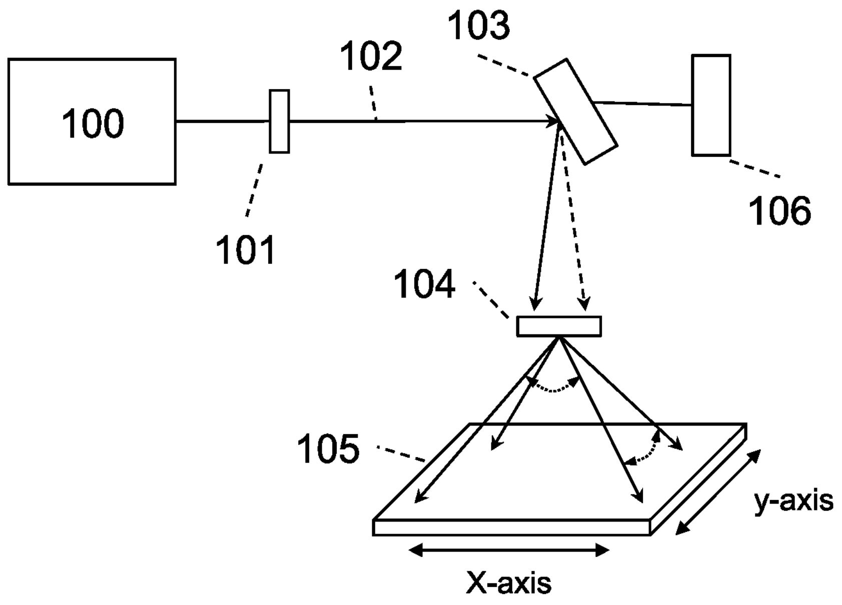
FIG. 1A: Block diagram of an exemplary embodiment for surface scanning.

FIG. 1A presents an exemplary embodiment for surface scanning. The exemplary embodiment includes a light source 100, a collimator 101, a scanning mirror 103, a focusing lens 104, and an electrical signal generator 106. The collimator 101 aligns and delivers the electromagnetic radiation (i.e., light beam) generated from the light source 100 to the scanning mirror 103. The scanning mirror 103 has a single-axis scanning. The scanning mirror 103 also has, for example, a biaxial scanning. The focusing lens 104, combined with the scanning mirror 103 driven by the electrical signal generator 106, focuses the collimated light 102 at different points as a waveform function to scan the target surface 105.

Figure 1B:
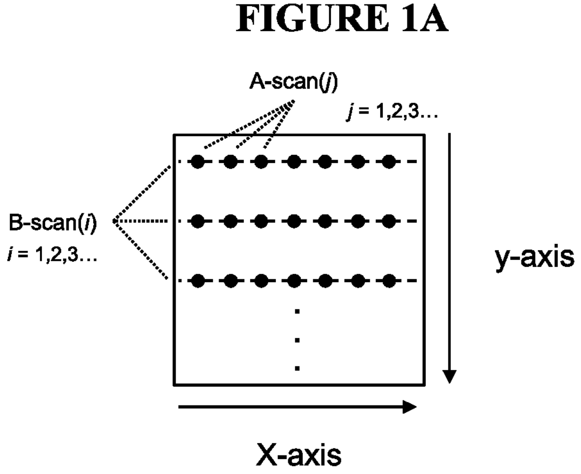
FIG. 1B: Diagram of an exemplary conventional pattern (e.g., raster scanning pattern) with the x-axis from left to right and the y-axis from top to bottom.

For example, the surface can be scanned in a conventional pattern (e.g., raster scanning pattern) with the x-axis from left to right and the y-axis from top to bottom, as shown in FIG. 1B, and the scan in the x-axis consists of the A-scan array/sequence. Scanning in the y-axis can occur in multiple B scans. Therefore, it is possible to use surface scanning to acquire data and generate images. Alternatively, surface scanning is also employed to provide therapeutic photothermal damage, such as ablation or coagulation. The scanning mirror 103 includes, but is not limited to, a galvo scanning mirror, resonance scanning mirror, micro-electromechanical systems (MEMS) based scanning mirror, and maybe any or a combination. The focusing lens can be customized as a wide-angle, such as ±14.0°, scanning lens. The electrical signal generator 106 can generate multiple and different types of waveforms, including, but are not limited to, electrical sinusoidal wave 501, positive ramp sawtooth wave with a single duty cycle 502, hybrid wave 503, electrical triangle wave 701, a frequency-increasing positive-ramp sawtooth wave as a function of time 702, up-chirp triangle wave 703, a frequency-increasing sinusoidal wave with a 90-degree phase shift 901, and frequency-modulated triangle wave 902.

Figure 2:
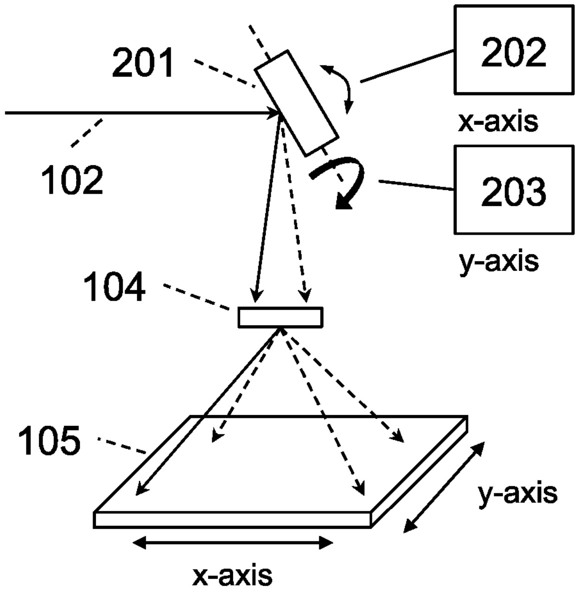
FIG. 2: Block diagram of an exemplary embodiment of a surface scanning system using a two-dimensional scanning mirror.
Figure 3:
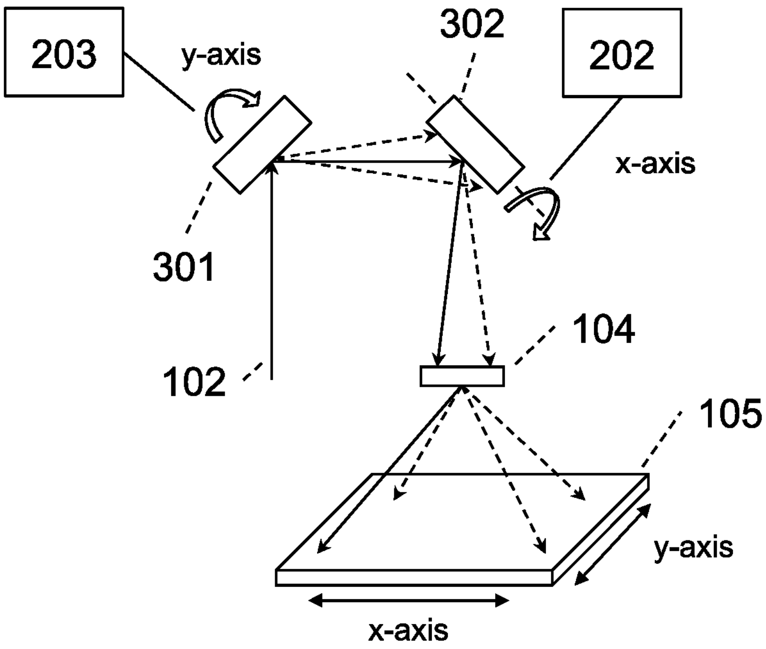
FIG. 3: Block diagram of an exemplary embodiment of the target surface scanning system using two one-dimensional scanning mirrors.

An exemplary embodiment of a surface scanning system using a two-dimensional scanning mirror 201 is presented in FIG. 2. As shown in FIG. 2, the collimated light 102 is reflected into the focusing lens 104 via a two-dimensional scanning mirror 201. The focusing lens 104 transmitted the collimated light 102 to different spots on the target surface 105, respectively, depending on the above electrical waveform. The two-dimensional scanning mirror 201 is driven by any or by a combination of the x-axis electrical signal generator 202 and the y-axis electrical signal generator 203. An exemplary embodiment of the target surface 105 scanning system using two one-dimensional scanning mirrors is presented in FIG. 3. As shown in FIG. 3, the collimated light 102 is reflected over a one-dimensional y-axis scanning mirror 301 and a one-dimensional x-axis scanning mirror 302, respectively. The focusing lens 104 coupled with the cascaded scanning mirrors precisely focuses the collimated light 102 directed by the scanners onto the target surface 105. The one-dimensional y-axis scanning mirror 301 is driven by the y-axis electrical signal generator 203, while the one-dimensional x-axis scanning mirror 302 is driven by the x-axis electrical signal generator 202. For example, in the exemplary embodiments presented in FIG. 2 and FIG. 3, generators can be phase-locked through a 10 MHz reference clock signal to provide intrinsically stable surface scanning. These electrical signal generators include, but are not limited to, the RF signal generator, the function generator, the random bit generator, and the bit pattern generator. The amplitude of the electrical signals based on waveforms listed above can vary within the ±10 V analog position signal range. The positive and negative signs of the voltage define the direction of rotation of the scanning mirror 103, namely right rotation or left rotation or vice versa. The amplitude determines the angle of rotation of the scanning mirror 103 corresponding to the position of the reflected light on the surface. Thus, the coordinate (i.e., position) of the light focused on the target surface 105 can be controlled by the amplitude of the electrical signals.

Further, the repetition rate of the electrical signal ($10^3$ to $10^6$ Hz) determines the rate at which the focused light returns to the same point, that is, the time it takes for it to be at the same point again. In other words, the scan rates of the system on the x-axis and y-axis can be defined by the frequency, i.e., the period of the electrical signal. Electrical signals can be analog signals and digital signals. In the exemplary surface scanning systems depicted in FIG. 2 and FIG. 3, all waveforms suggested in the present invention can drive the two-dimensional scanning mirror 201, the one-dimensional y-axis scanning mirror 301, and the one-dimensional x-axis scanning mirror 302. Besides, these waveforms, including hybrid wave 503, up-chirp triangle wave 703, and frequency-modulated triangle wave 902, generate such surface scanning patterns/protocols, providing a wide and dynamic interscan time interval. Also, all waveforms can be used for both x-axis scanning and y-axis scanning of the surface.

Figure 4A:
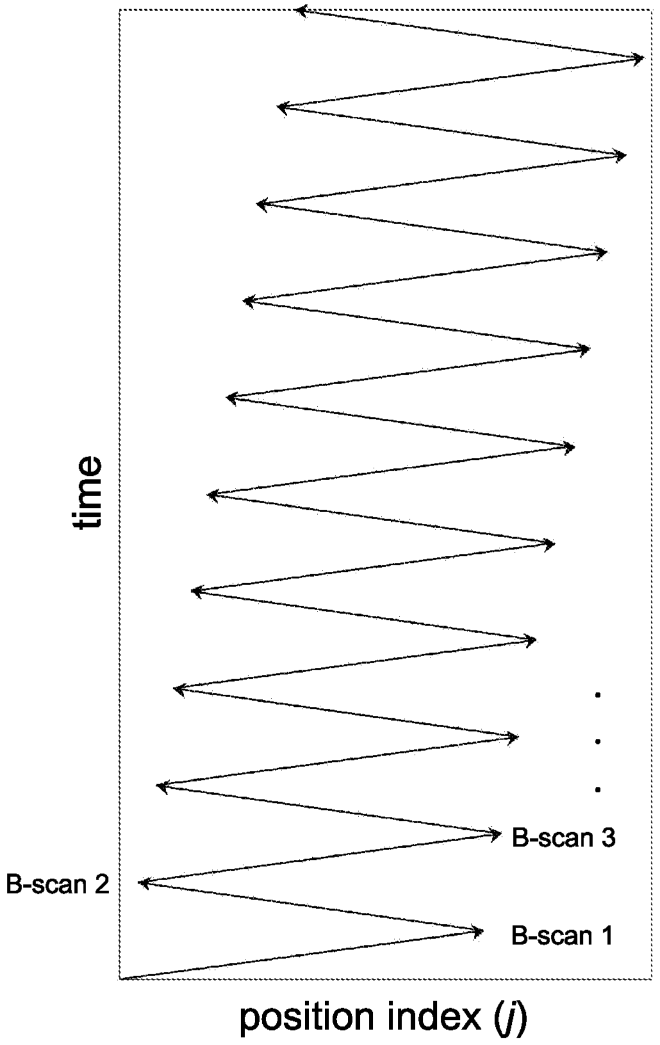
FIG. 4A: A graph illustrating representative bidirectional scan pattern/protocol that can be configured to produce a wide and dynamic interscan time interval according to a representative waveform embodiment shown in FIG. 5.
Figure 4B:
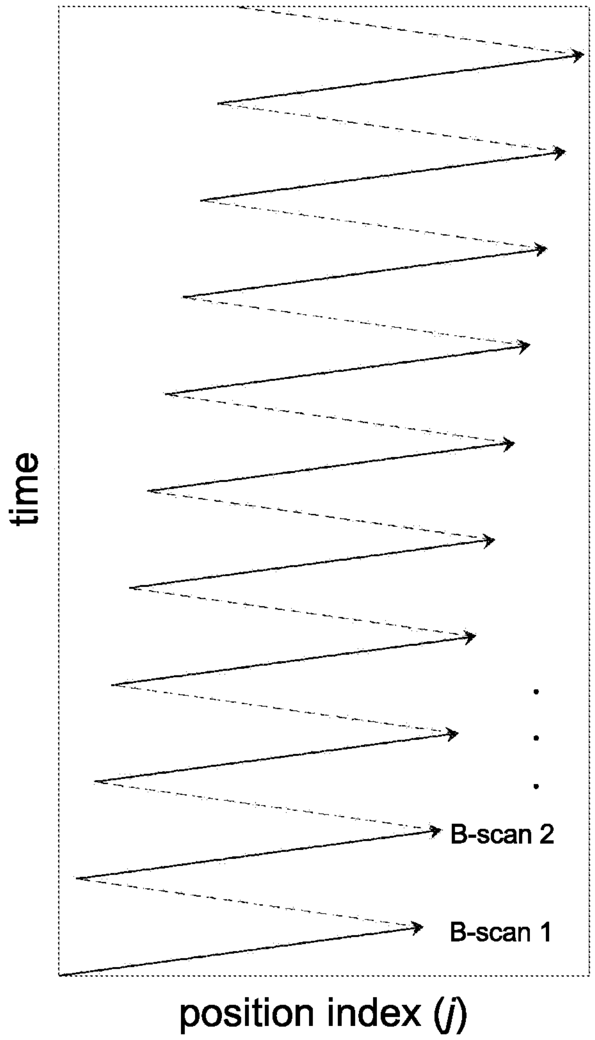
FIG. 4B: A graph illustrating representative unidirectional scan pattern/protocol that can be configured to produce a wide and dynamic interscan time interval according to a representative waveform embodiment shown in FIG. 5.

FIG. 4 shows a diagram of the surface scan pattern/protocol that can be configured to produce a wide and dynamic interscan time interval according to a representative waveform embodiment of the present disclosure. FIG. 4A shows the bidirectional scan pattern/protocol, and FIG. 4B shows the unidirectional scan pattern/protocol. Both scan patterns/protocols point to the sequential position index (j), i.e., the A-scan index (j), while the y-axis denotes the time. The solid arrow line represents the B scan and the direction of the scan, and each B-scan consists of a series of A-scans corresponding to the depth-resolved point scans on the target surface 105. In the case of unidirectional scanning, the dashed line after each B-scan represents the rollback required to restore the scanner to its starting position.

Figure 5:
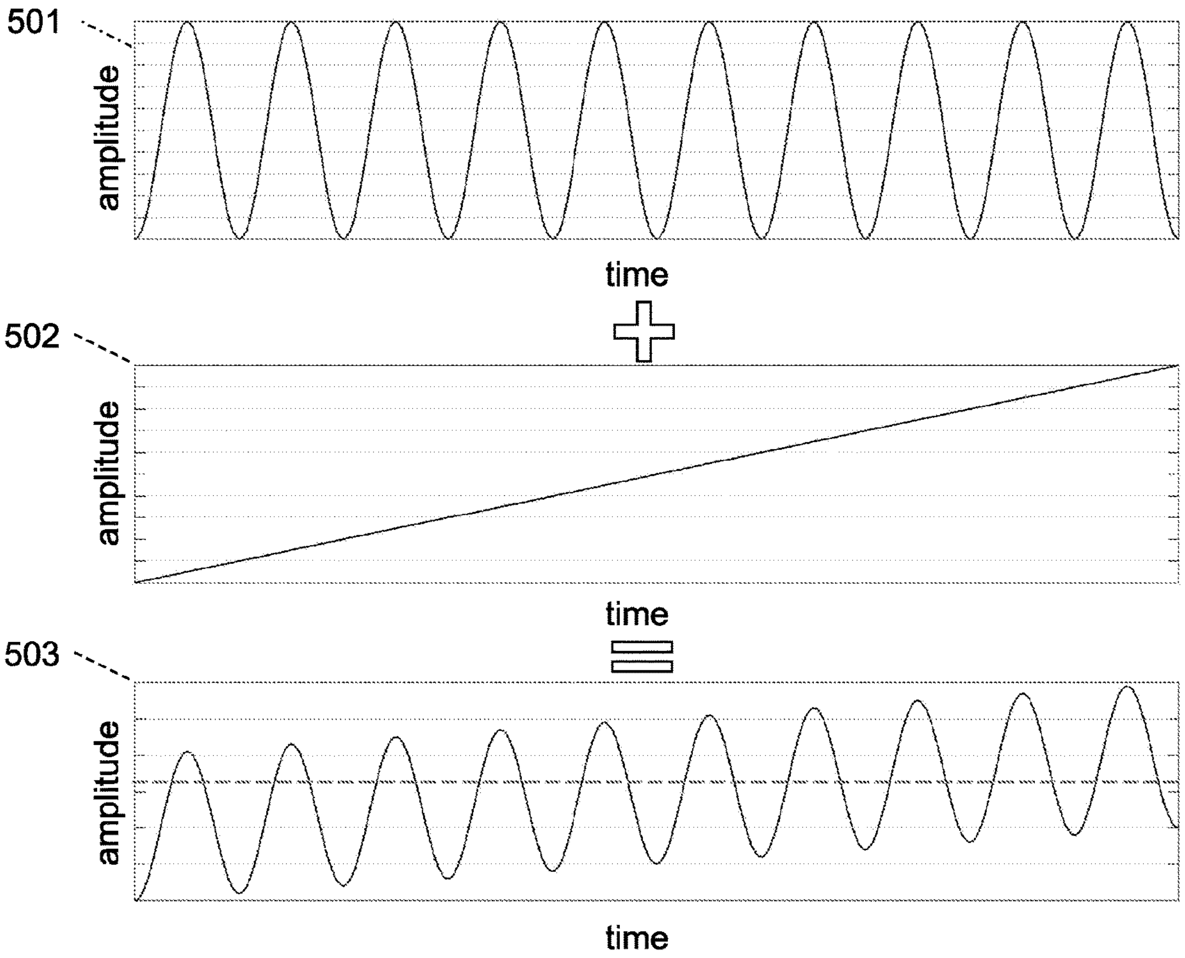
FIG. 5: A series of graphs illustrating an exemplary embodiment of a hybrid waveform obtained by varying the direct current (DC) offset voltage of an electrical sinusoidal wave linearly in time as a function of the positive ramp sawtooth wave with a single duty cycle.

FIG. 5 shows an exemplary embodiment of a hybrid wave 503. Combining conventional sinusoidal and sawtooth waves, hybrid wave 503 can be used to generate the representative surface scan model/protocol of the present disclosure presented in FIG. 4. In other words, by varying the direct current (DC) offset voltage of an electrical sinusoidal wave 501 linearly in time as a function of the positive ramp sawtooth wave with a single duty cycle 502, hybrid wave 503 can be generated. Thus, at a constant peak-to-peak voltage value, the peak voltage of the electrical sinusoidal wave 501 shifts in time with the amplitude of the electrical signal in the ramp waveform. The shift rate equals the repetition rate of the electrical signal in the ramp waveform. The shift rate can be at least 100 times slower than the repetition rate of the signal based on the electrical sinusoidal wave 501.

The amplitude of the electrical sinusoidal wave 501 does not typically change linearly with time. Thus, the direct current (DC) offset voltage shift over time causes the electrical sinusoidal wave 501 to reach its instantaneous amplitude at different nonlinear time intervals, as illustrated, for example, in FIG. 5 by the dashed line in the hybrid wave 503. In other words, a wide and dynamic interscan time interval is produced depending on the amplitude and repetition rate of a hybrid wave 503 and the time shift rate of the direct current (DC) offset voltage. The peak-to-peak voltage of the electrical sinusoidal wave 501 is lower than the peak voltage of the positive ramp sawtooth wave with a single duty cycle 502. The number of duty cycles of the positive ramp sawtooth wave can be increased for multiple scans.

Another representative waveform embodiment of the present invention can configure the surface scan pattern/protocol shown in FIG. 6 to produce a wide and dynamic interscan time interval. This exemplary surface scan pattern/protocol is obtained by having the electrical signal driving the scanning mirror 103 based on the up-chirp triangle wave 703.

Figure 6A:
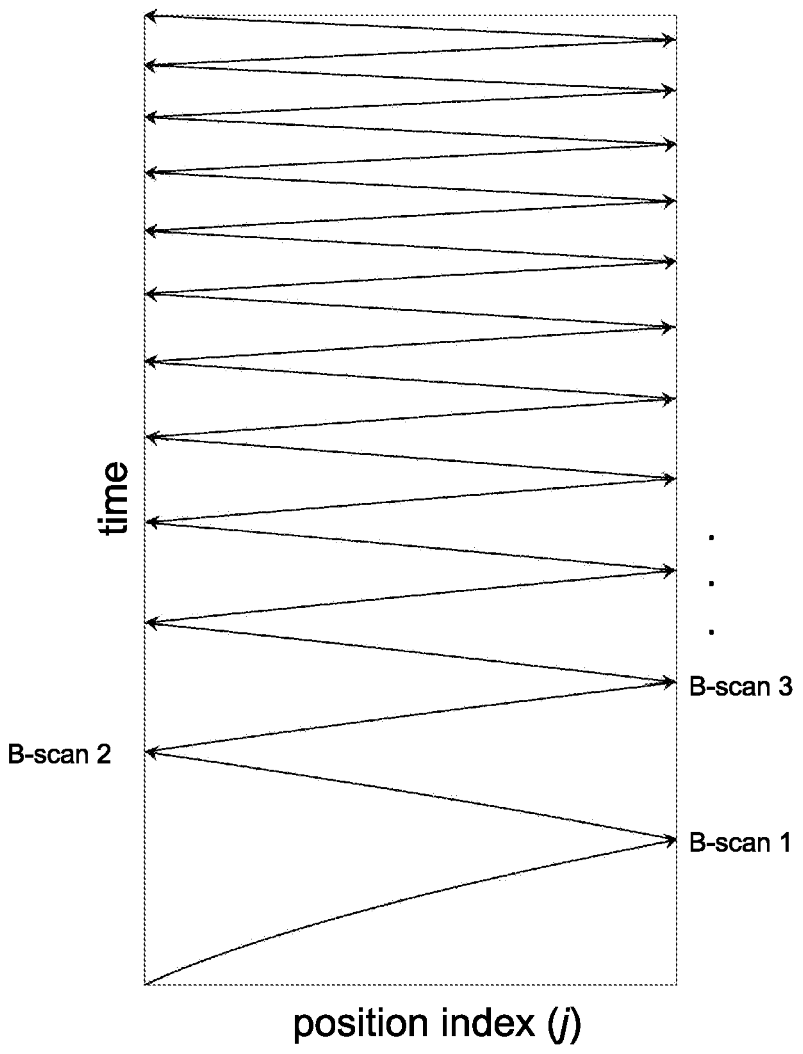
FIG. 6A: A graph illustrating representative bidirectional scan pattern/protocol that can be configured to produce a wide and dynamic interscan time interval according to a representative waveform embodiment shown in FIG. 7.
Figure 6B:
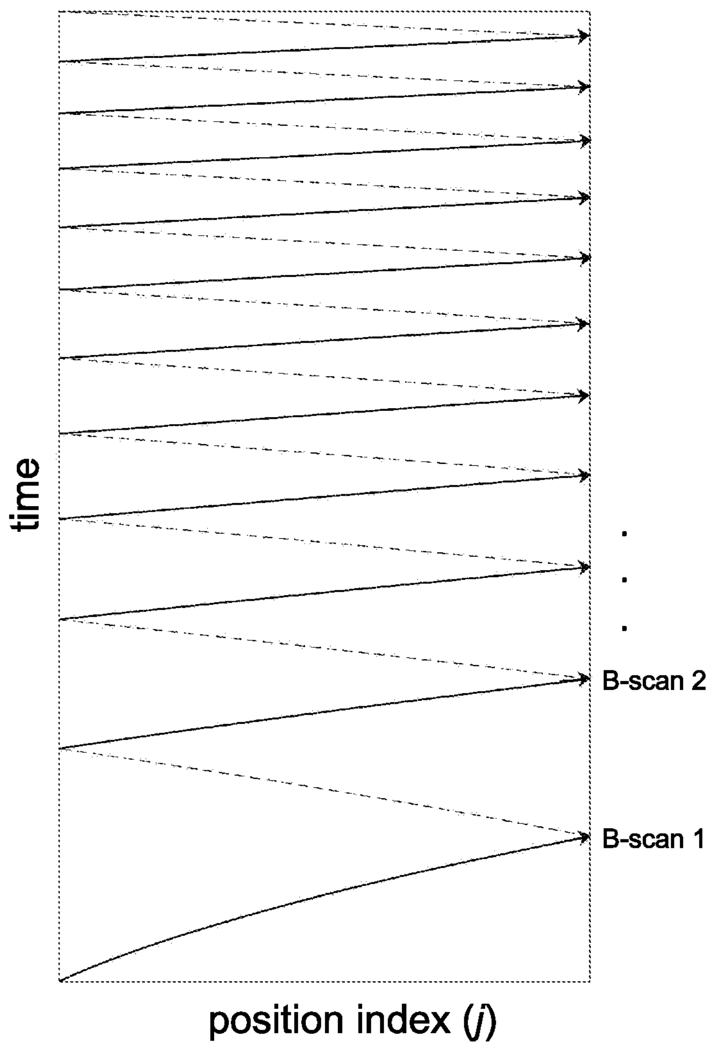
FIG. 6B: A graph illustrating representative unidirectional scan pattern/protocol that can be configured to produce a wide and dynamic interscan time interval according to a representative waveform embodiment shown in FIG. 7.

A bidirectional scan of the up-chirp triangle wave 703 based surface scan pattern/protocol is exemplarily shown in FIG. 6A. FIG. 6B presents an example of unidirectional scanning of the same surface scan pattern/protocol. The dashed line after each B-scan (that consists of a series of A-scans) represents the scanning mirror returning to its initial position in this scanning case. The solid line and arrowhead indicate the B-scan and the direction of the scan. The x-axis marks the position index in the graphical representation of the surface scan pattern/protocol, and the y-axis marks the return to the same position spot at different time intervals.

Figure 7:
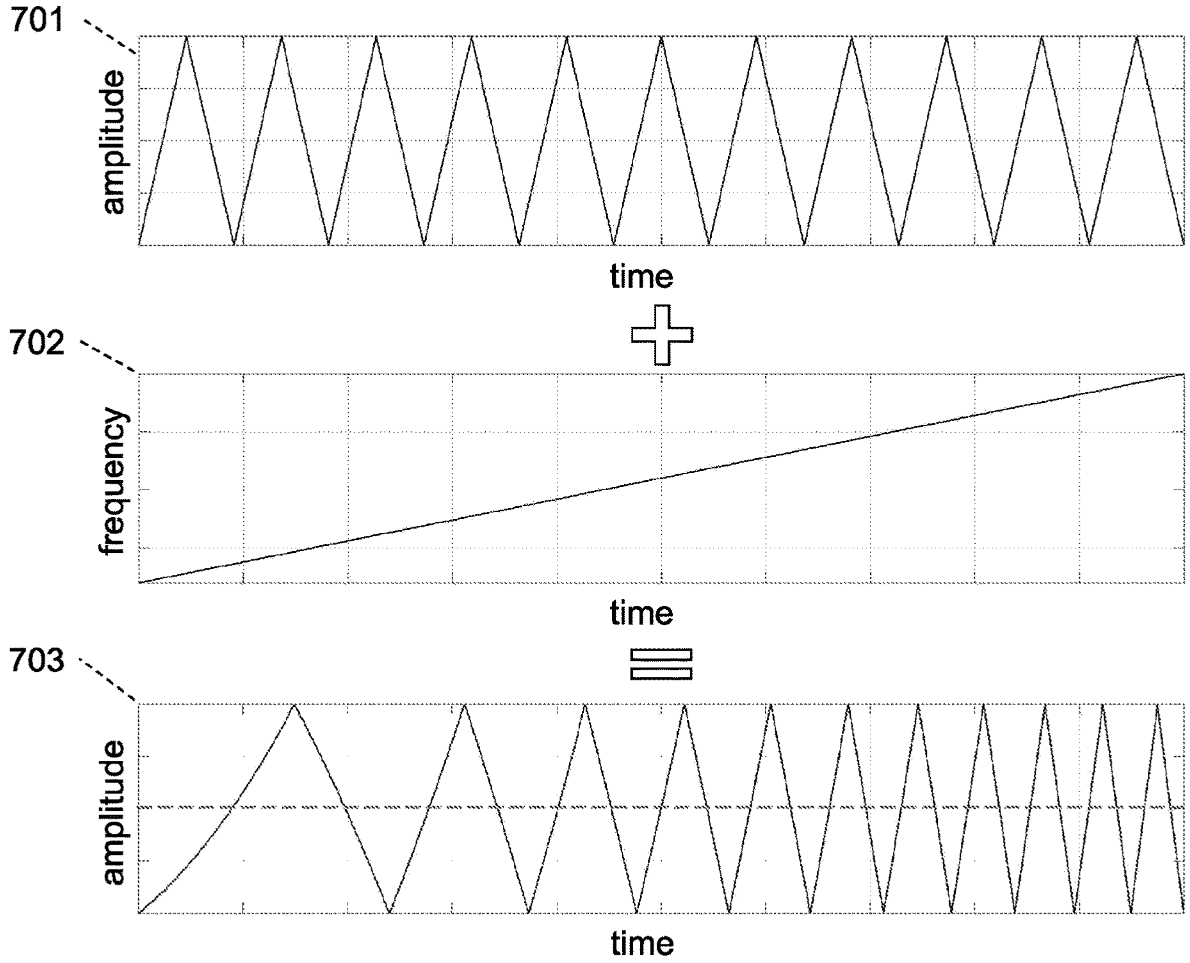
FIG. 7: A series of graphs illustrating an exemplary embodiment of the up-chirp triangle waveform obtained by continuously increasing the frequency of an electrical triangle wave as a function of time in the form of a positive ramp sawtooth.

FIG. 7 demonstrates an exemplary embodiment of the up-chirp triangle wave 703 that can generate the surface scan pattern/protocol shown in FIG. 6. An electrical triangle wave 701 produces the up-chirp triangle wave 703 by frequency increase as a function of time in the form of a positive ramp sawtooth. As the dashed line in FIG. 7 presents, the signal's amplitude reaches the same voltage at different time intervals.

This inference ensures that the light focused on the target surface 105 visits the exact spot at different time intervals. Therefore, the time difference between the first and second scans is different from the time between the second and third scans. Scans include B-scans and C-scans, depending on the scan axes.

The sweep range defines the width of the time intervals between scans (e.g., the first scan and the last scan), while the frequency change rate dynamically defines the variation of the time interval between scans. The rate of frequency increase as a function of time in the positive ramp sawtooth form defines the frequency change rate. The instantaneous frequency varies linearly or exponentially with time.

Alternatively, or additionally, a down-chirp triangle wave can provide a similar surface scan pattern/protocol produced by an up-chirp triangle wave. Besides, an electrical sinusoidal wave 501 can be used instead of the electrical triangle wave 701 to obtain a chirp electrical signal driven surface scan pattern/protocol. The B-scan number or C-scan number can be multiplied by increasing the duty cycle number of the frequency increase as a function of time in the positive ramp sawtooth form.

Figure 8A:
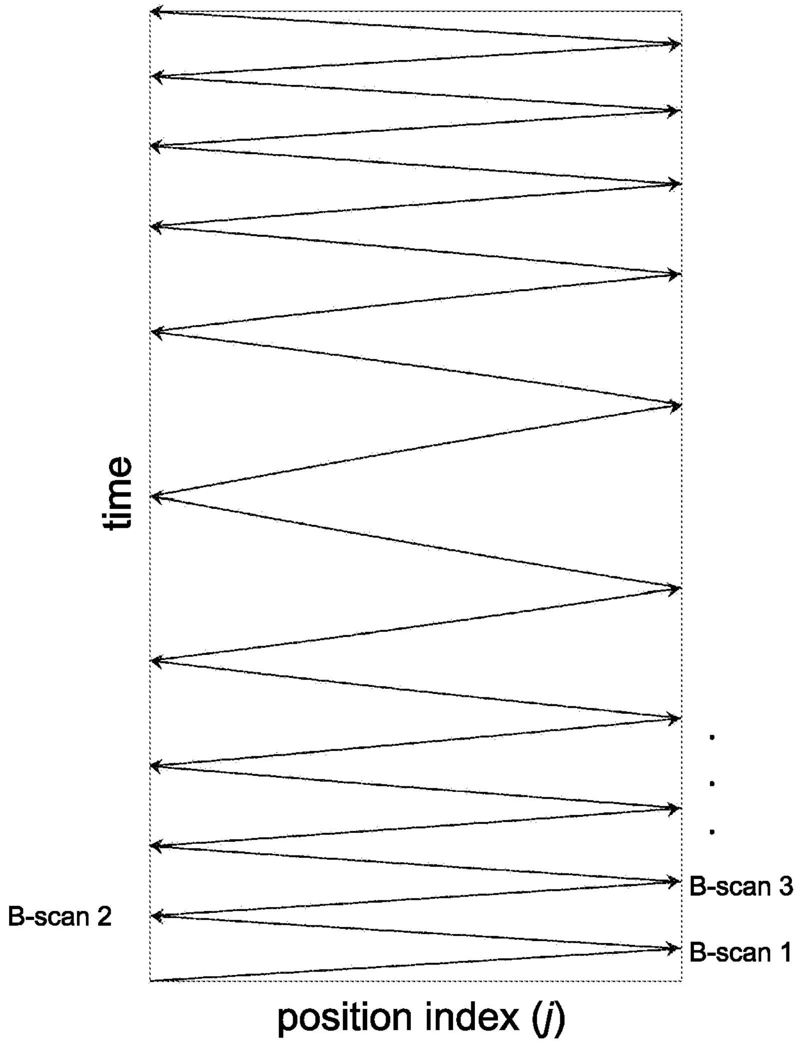
FIG. 8A: A graph illustrating representative bidirectional scan pattern/protocol that can be configured to produce a wide and dynamic interscan time interval according to a representative waveform embodiment shown in FIG. 9.
Figure 8B:
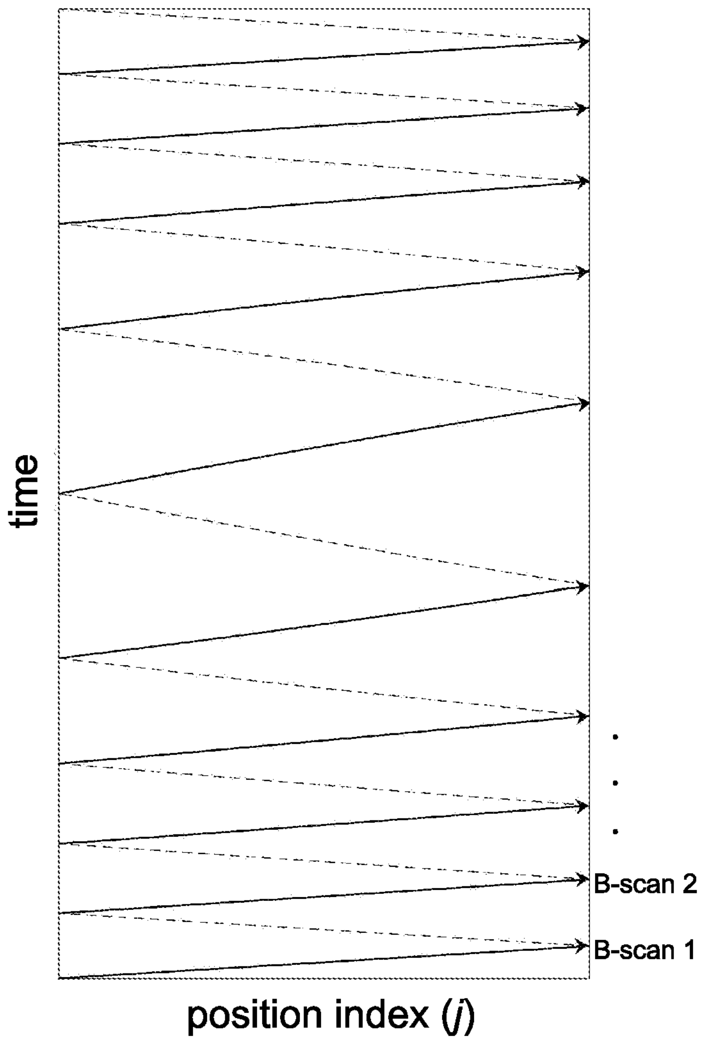
FIG. 8B: A graph illustrating representative unidirectional scan pattern/protocol that can be configured to produce a wide and dynamic interscan time interval according to a representative waveform embodiment shown in FIG. 9.

FIG. 8A and FIG. 8B demonstrate the bidirectional and unidirectional surface scan pattern/protocol in time, respectively, of another representative waveform embodiment of the present invention for a wide and dynamic interscan time interval. A frequency-modulated triangle wave 902 generates the representative surface scanning pattern/protocol. As with all the exemplary surface scan model/protocols listed throughout the text, the solid line with the arrowhead represents the B-scan and scan direction, and the dashed line represents the rollback in the unidirectional scanning.

Figure 9:
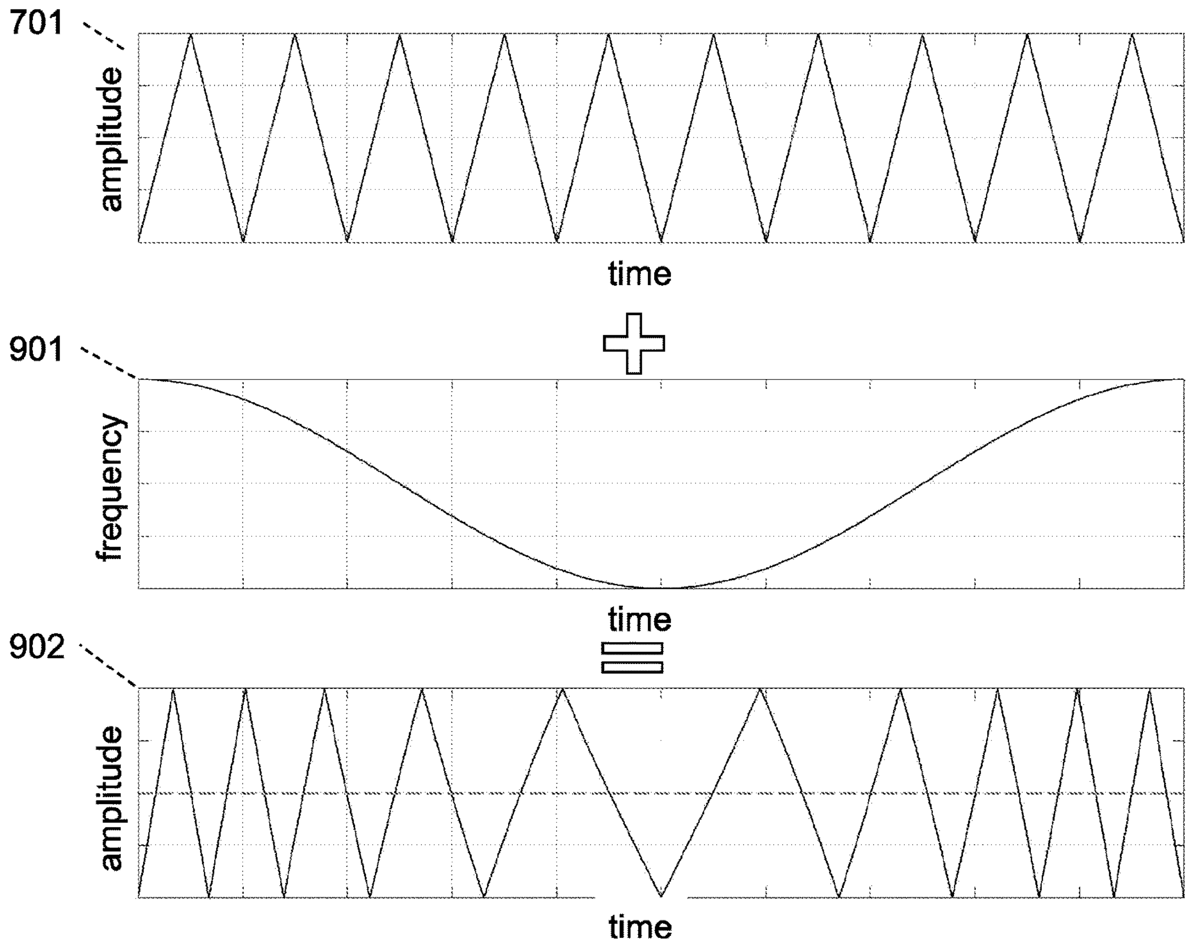
FIG. 9: A series of graphs illustrating an exemplary embodiment of the frequency-modulated waveform obtained by modulating the electrical triangle wave with frequency deviation as a function of time in a 90-degree phase retarded sinusoidal form within a deviation range of the +/−peak frequency.

As depicted in FIG. 9, a frequency modulated triangle wave 902 can be obtained by modulating the electrical triangle wave 701 with a frequency-increasing sinusoidal wave with a 90-degree phase shift 901. The frequency range of the frequency-modulated triangle wave 902 is defined by the deviation of the +/−peak frequency (i.e., instantaneous frequency). Thus, a scanning pattern consisting of nonlinear acceleration, deceleration, and acceleration in the specified modulation range is obtained by driving the scanning mirror with the frequency modulated signal. For example, as indicated by the dashed line in FIG. 9, a frequency modulated triangle wave 902 can reach the same voltage corresponding to a position at different time intervals, producing a wide and dynamic interscan time interval. The frequency modulation rate is determined by the repetition rate of a frequency-increasing sinusoidal wave with a 90-degree phase shift 901. Furthermore, the number of duty cycles can be increased for multiple scans based on the frequency-modulated triangle wave 902.

The periodicity of the presence of focused light at a location on the target surface is changed from fast to slow and from slow to fast with a scanning mirror 103 driven by the frequency-modulated triangle wave 902. Alternatively, or additionally, the surface scan pattern/protocol of the present invention presented in FIG. 8 can also be generated for an electrical sinusoidal wave 501 instead of an electrical triangle wave 701.

The present disclosure's representative surface scan model/protocol presented in FIG. 4, FIG. 6, or FIG. 8 can be used on each or a combination of the B-scan (x-axis, z-axis) consisting of a series of A-scans (z-axis or depth) and the C-scan (x-axis, y-axis, z-axis) consisting of a series of B-scans (x-axis, z-axis). a wide dynamic scan-to-scan time interval can be produced between the corresponding B-scans and between corresponding C-scans. All scans can be bidirectional or unidirectional.

Surface scan patterns/protocols of the present invention to be generated with the waveforms described in FIG. 4, FIG. 6, and FIG. 8 were simulated by developing numerical modeling with exemplary time scale arrangements (i.e., 103 seconds) capable of producing a wide and dynamic interscan time interval. The exemplary numerical model predicted simulation results of waveforms in the time domain, and some parts of the invention were realized, including hybrid wave 503, up-chirp triangle wave 703, and frequency-modulated triangle wave 902. Besides, the model included time interval calculations between consecutive B-scans and C-scans provided in the bidirectional and unidirectional modes.

Figure 10:
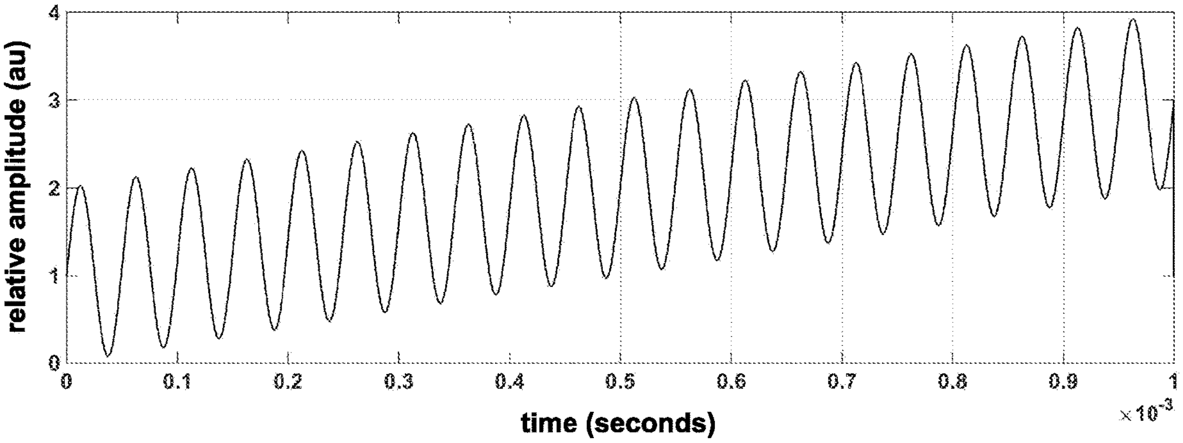
FIG. 10: A graph representing the simulated estimate of the 1-millisecond long hybrid wave calculated by linearly increasing the direct current (DC) offset voltage over time as a function of the positively ramped sawtooth wave with a single duty cycle.

FIG. 10 shows the simulated estimate of the 1-millisecond long hybrid wave calculated by linearly increasing the direct current (DC) offset voltage over time as a function of the positively ramped sawtooth wave with a single duty cycle 502. The exemplary numerical model used a sinusoidal wave with a repetition rate of 20 kHz (i.e., a period of 500 ms) and relative amplitude of 2 arbitrary units from peak to peak. A positive ramp sawtooth wave with a single duty cycle linearly increases the DC voltage at a repetition rate of 1 kHz (i.e., a period value of 1 ms) and a peak-to-peak relative amplitude of 4 arbitrary units (4 au).

Figure 11:
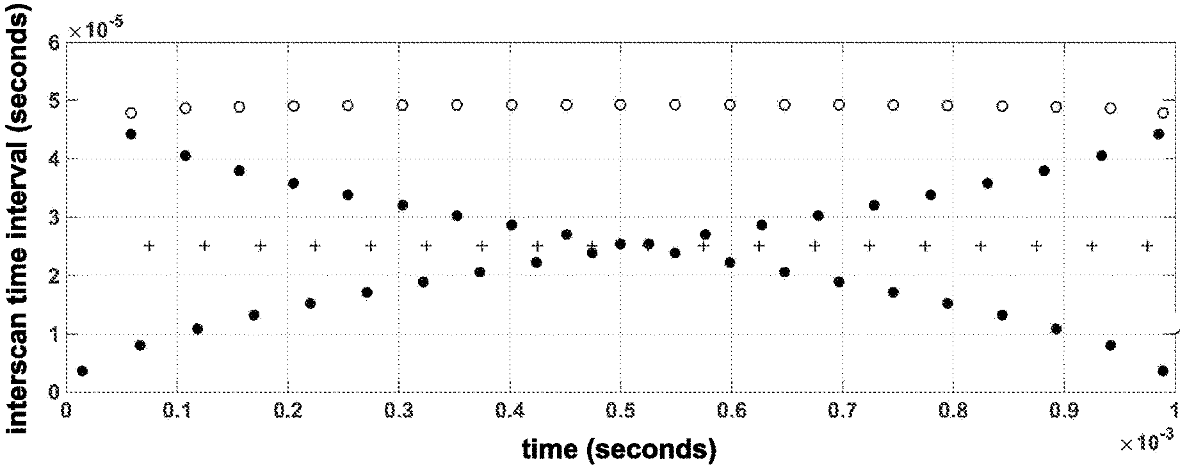
FIG. 11: A graph representing the estimated time intervals of consecutive B-scans in bidirectional and unidirectional scanning modes, respectively, to illustrate better the effect of the scan pattern/protocol based on waveform shown in FIG. 10.

FIG. 11 shows the calculated time differences between consecutive B-scans in the bidirectional and unidirectional scanning modes, respectively. Solid black circles indicate interscan time difference results in a bidirectional scan, and empty black circles indicate interscan time difference results in a unidirectional scan. Also, the fixed time interval between successive B-scans produced by sinusoidal wave-based electrical signals used in conventional surface scanning protocols could be compared on the same graph. An exemplary conventional surface scanning protocol simulation was performed for a sinusoidal wave with a repetition rate of 20 kHz (i.e., a period of 50 μs) and a relative amplitude of 2 arbitrary units from peak to peak. According to the numerical model, the constant time difference between scans in bidirectional mode was calculated as 25 μs, which is half of the sinusoidal wave period. Estimated results are marked with black crosses. On the other hand, the surface scanning protocol/pattern based on an exemplary hybrid wave 503 presented in FIG. 10 provided a time interval between 35.7 μs and 442 us in the bidirectional scanning mode. The predicted fast and slow scan rate differences corresponded to a wide and dynamic interscan time interval of >0.406 ms.

Figure 12:
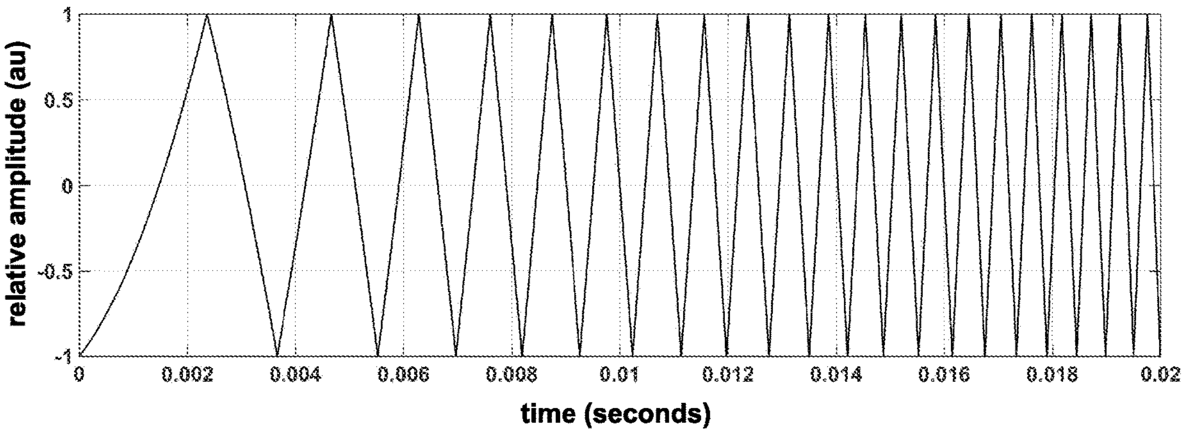
FIG. 12: A graph representing the numerical simulation of the up-chirp triangle wave modeled as a sawtooth triangle wave (2 au peak to peak) whose frequency increases as a function of time in the form of a positive ramp in the range of 100 Hz to 2 KHz.

As shown in FIG. 12, the numerical modeling simulated another representative waveform embodiment of the present invention for a wide and dynamic interscan time interval. An exemplary up-chirp triangle wave was modeled as a sawtooth triangle wave (2 au peak to peak) whose frequency increases as a function of time in the form of a positive ramp in the range of 100 Hz to 2 KHz.

Figure 13:
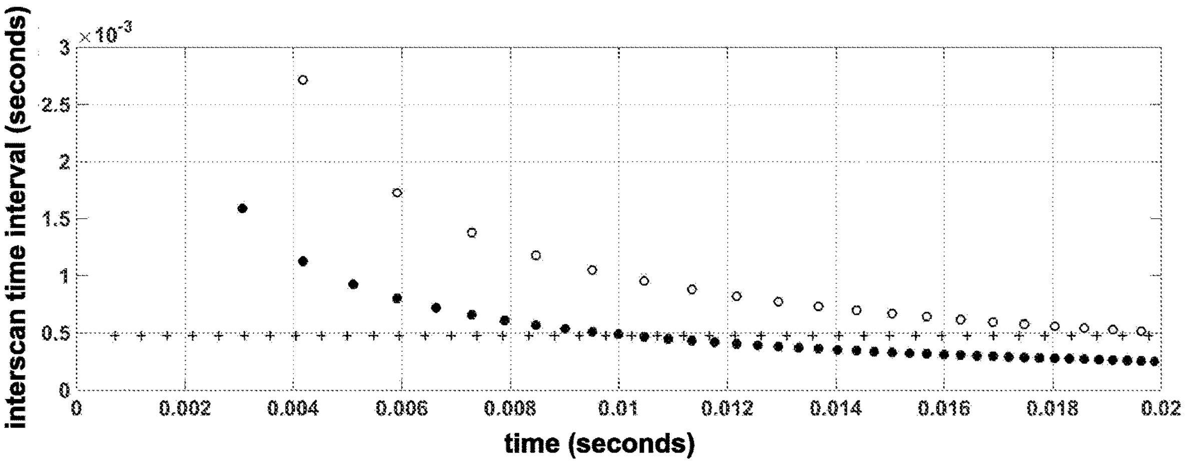
FIG. 13: A graph representing the estimated time intervals of consecutive B-scans in bidirectional and unidirectional scanning modes, respectively, to illustrate better the effect of the scan pattern/protocol based on waveform shown in FIG. 12.

FIG. 13 presents the estimated time intervals of consecutive B-scans in bidirectional and unidirectional scanning modes to illustrate better the effect of the scan pattern/protocol using the numerical model. Calculated interscan time differences are marked with solid black circles for the bidirectional scan and hollow black circles for the unidirectional scan. The sample computation model calculated that the fastest 0.253 ms and the slowest 1.59 ms time difference was produced between bidirectional B scans, while the fastest 0.516 ms and slowest 2.713 ms time difference was calculated for unidirectional B-scans. Thus, the time differences corresponded to dynamic interscan time intervals >1.3 ms and >2.1 ms wide, respectively. For a direct comparison, the black crosses indicate the constant time difference between consecutive bidirectional B-scans that the triangle wave would provide at a repeat rate of 1050 Hz (i.e., a period of 0.95 ms) and relative amplitude of 2 arbitrary units. The fixed time interval between corresponding consecutive scans was estimated as 0.48 ms.

Figure 14:
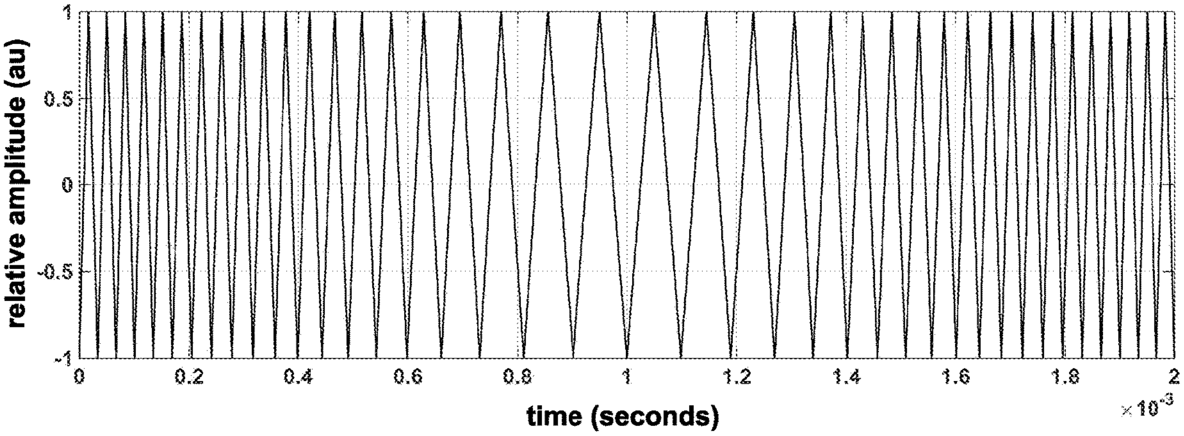
FIG. 14: A graph representing the numerical simulation of the frequency-modulated triangular wave modeled as the frequency modulation of a 2-au peak-to-peak triangle signal at 20 kHz (i.e., a period of 50 μs) within +/−10 KHz frequency deviation.

FIG. 14 presents an exemplary numerical model of the frequency-modulated triangular wave, another representative waveform embodiment of the present invention, which can provide a bidirectional and unidirectional surface scan pattern/protocol for a wide and dynamic interscan time interval. The model computed the frequency modulation of a 2-au peak-to-peak triangle signal at 20 kHz (i.e., a period of 50 μs) within +/−10 KHz frequency deviation. The peak frequency numerically deviated from 10 KHz to 30 KHz as a function of time in a 90-degree phase retarded sinusoidal form.

Figure 15:
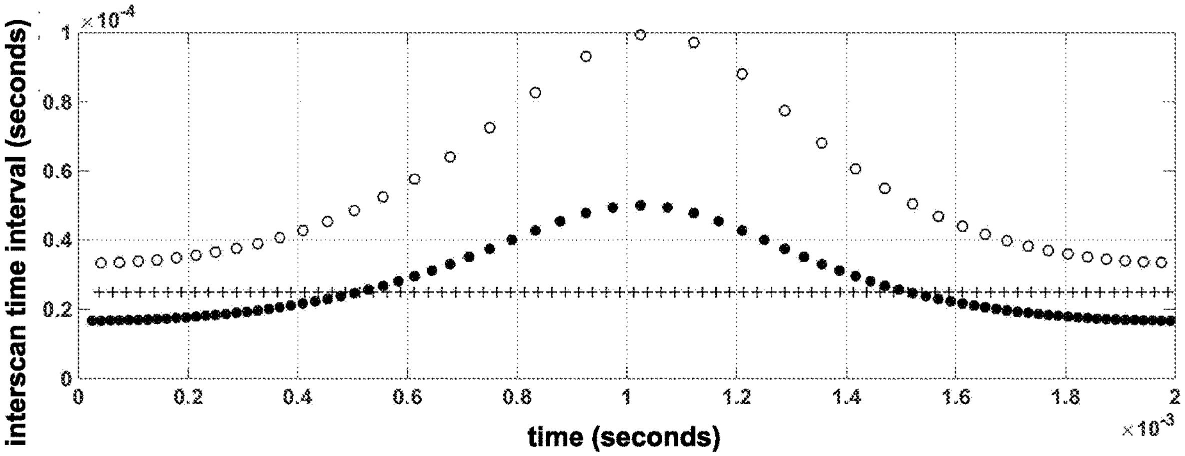
FIG. 15: A graph representing the estimated time intervals of consecutive B-scans in bidirectional and unidirectional scanning modes, respectively, to illustrate better the effect of the scan pattern/protocol based on waveform shown in FIG. 14.

The modulation rate was 500 Hz, the frequency of a 90-degree delayed single-cycle sinusoidal wave. FIG. 15 presents the calculations of the time difference between successive B-scans and the corresponding time intervals. Solid circles show bidirectional scan results, and hollow circles show unidirectional scan results. Within the exemplary computational model of the surface scanning model/protocol based on frequency modulation, dynamic interscan time intervals of >66 μs for bidirectional scanning and >33 us for unidirectional scanning were obtained. For direct comparison with the conventional surface scan model/protocol, the estimated results of an electrical signal based on the triangular waveform at 20 KHz producing a fixed time interval of 25 μs between bidirectional B-scans are presented in FIG. 15 with black crosses.

CITATION LIST

Patent Literature

TR2018/10000, U.S. Pat. No. 10,839,568B2, EP2054712A2, US20150233701A1, U.S. Pat. No. 10,136,865B2

Non-Patent Literature

1. V. F. Duma, K. S. Lee, P. Meemon and J. P. Rolland, "Experimental investigations of the scanning functions of galvanometer-based scanners with applications in OCT," Appl. Opt. 50 (29), 5735-5749 (2011).
2. V. F. Duma, P. Tankam, J. Huang, J. Won and J. P. Rolland, "Optimization of galvanometer scanning for optical coherence tomography," Appl. Opt. 54 (17), 5495-5507 (2015).
3. A. Szkulmowska, M. Szkulmowski, D. Szlag, A. Kowalczyk and M. Wojtkowski, "Three-dimensional quantitative imaging of retina! and choroidal blood flow velocity using joint Spectral and Time domain Optical Coherence Tomography," Opt. Express 17 (13), 10584-10598 (2009).
4. P. Meemon and J. P. Rolland, "Swept-source based, single-shot, multidetectable velocity range Doppler optical coherence tomography," Biomed. Opt. Express 1 (3), 955-966 (2010).
5. M. J. Ju, M. Heisler, A. Athwal, M. V. Sarunic and Y. Jian, "Effective bidirectional scanning pattern for optical coherence tomography angiography," Biomed. Opt. Express 9 (5), 2336-2350 (2018).
6. T. Park, S. J. Jang, M. Han, S. Ryu and W. Y. Oh "High dynamic range optical coherence tomography angiography (HDR-OCTA)," Opt. Express 10 (7), 3560-3571 (2019).
7. L. Shi, J. Qin, R. Reif and R. K. Wang, "Wide velocity range Doppler optical microangiography using optimized step-scanning protocol with phase variance mask," J Biomed Opt. 18 (10), 106015 (2013).
8. 1. Grulkowski, 1. Gorczynska, M. Szkulmowski, D. Szlag, A. Szkulmowska, R. A. Leitgeb, A. Kowalczyk and M. Wojtkowski "Scanning protocols dedicated to smart velocity ranging in Spectral OCT," Opt. Express 17 (26), 23736-23754 (2009).
9. W. Choi, E. M. Moult, N. K. Waheed, M. Adhi, B. Lee, C. D. Lu, E. Talisa, V. Jayaraman, P. J. Rosenfeld, J. S. Duker and J. G. Fujimoto, "Ultrahigh-speed, swept-source optical coherence tomography angiography in nonexudative age-related macular degeneration with geographic atrophy," Ophthalmology 122 (12), 2532 (2015).
10. S. B. Ploner, E. M. Moult, W. Choi, N. K. Waheed, B. Lee, E. A. Novais, E. D. Cole, B. Potsaid, L. Husvogt, J. Schottenhamml and J. G. Fujimoto, "Toward Quantitative Optica Coherence Tomography Angiography: Visualizing Blood Flow Speeds in Ocular Pathology Using Variable Interscan Time Analysis," Retina 36, S I 18-SI26 (2016).
11. F. Jaillon, S. Makita and Y. Yasuno, "Variable velocity range imaging of the choroid with dual-beam optical coherence angiography," Opt. Express 20 (1), 385-396 (2011).
12. S. Kim, T. Park, S. J. Jang, A. S. Nam, B. J. Vakoc and W. Y. Oh, "Multi-functional angiographic OFDI using frequency-multiplexed dual-beam illumination," Opt. Express 23 (7), 8939-8947 (2015).
13. T. Park, S. J. Jang, M. Han, S. Ryu, and W. Y. Oh, "Wide dynamic range high-speed three-dimensional quantitative OCT angiography with a hybrid-beam scan," Optics Lett. 43 (10), 2237-2240 (2018).

The invention claimed is:

1. A surface scanning system to generate a wide and dynamic interval between scans to be used in a point imaging process of surface scan patterns, comprising a collimator (101) that transforms a light or an electromagnetic radiation generated from a light source (100) into collimated light or light beam (102), at least one scanning mirror (103) that moves in one or two dimensions and allows the incident collimated light or light beam (102) to be reflected, at least one electrical signal generator (106) that generates electrical signals in different waveforms calculated using numerical model, determines a rotation angle of the scanning mirror (103) with a voltage of the generated electrical signals, drives the scanning mirror (103), and performs unidirectional or bidirectional surface scans with the collimated light or light beam (102) by the scanning mirror (103) it drives, and a focusing lens 104 that enables scanning a target surface (105) by focusing the collimated light or light beam (102) to different points with the scanning mirror (103) driven by the electrical signal generator (106).

2. The surface scanning system according to claim 1, wherein the electrical signal generator (106) is an RF signal generator, function generator, random bit generator, or bit pattern generator.

3. The surface scanning system according to claim 1, wherein the scanning mirror (103) is at least one of a galvo scanning mirror, resonance scanning mirror, or micro-electromagnetic systems (MEMS) based scanning mirror.

4. The surface scanning system according to claim 1, wherein the focusing lens (104) is a wide-angle scanning lens.

5. The surface scanning system according to claim 1, wherein the scanning mirror (103) is a two-dimensional scanning mirror (201) that enables the target surface (105) to be driven with fast electrical signals to perform surface scanning on any of its axes or on a combination of an x-axis and y-axis.

6. The surface scanning system according to claim 5, comprising an x-axis electrical signal generator (202) that drives a two-dimensional scanning mirror (201) to provide scanning in the x-axis.

7. The surface scanning system according to claim 6, comprising the x-axis electrical signal generator (202) configured to generate an electrical signal having at least one waveform selected from the group consisting of: an electrical sinusoidal wave (501), a positive ramp sawtooth wave with a single duty cycle (502), a hybrid wave (503), an electrical triangle wave (701), a frequency-increasing positive-ramp sawtooth wave as a function of time (702), an up-chirp triangle wave (703), a frequency-increasing sinusoidal wave with a 90-degree phase shift (901), and a frequency-modulated triangle wave (902).

8. The surface scanning system according to claim 7, wherein the electrical signal generated by the x-axis electrical signal generator (202) is in a form of an up-chirp triangle wave (703).

9. The surface scanning system according to claim 5, comprising a y-axis electrical signal generator (203) that drives a two-dimensional scanning mirror (201) to provide scanning in the y-axis.

10. The surface scanning system according to claim 9, comprising the y-axis electrical signal generator (203) configured to generate an electrical signal having at least one waveform selected from the group consisting of: an electrical sinusoidal wave (501), a positive ramp sawtooth wave with a single duty cycle (502), a hybrid wave (503), a electrical triangle wave (701), a frequency-increasing positive-ramp sawtooth wave as a function of time (702), an up-chirp triangle wave (703), the frequency-increasing sinusoidal wave with a 90-degree phase shift (901), and a frequency-modulated triangle wave (902).

11. The surface scanning system according to claim 10, wherein the electrical signal generated by the y-axis electrical signal generator (203) is in a form of the frequency-modulated triangle wave (902).

12. The surface scanning system according to claim 1, comprising two scanning mirrors (103).

13. The surface scanning system according to claim 12, wherein one of the scanning mirrors (103) is a one-dimensional y-axis scanning mirror (301) that can scan a y-axis of the target surface (105) by being driven with a y-axis electrical signal generator (203) and reflecting the collimated light or light beam (102), and the other one is a one-dimensional x-axis scanning mirror (302) that can scan a x-axis of the target surface (105) by being driven with an x-axis electrical signal generator (202) and reflecting the collimated light or light beam (102).

14. The surface scanning system according to claim 13, comprising the x-axis electrical signal generator (202) driving the one-dimensional x-axis scanning mirror (302) and the y-axis electrical signal generator (203) driving the one-dimensional y-axis scanning mirror (301), using a phase lock or 10 MHz reference clock or a combination of the phase lock and 10 MHz reference lock to work in a same temporal space, or clock signal.

15. The surface scanning system of claim 1, wherein the voltage of the electrical signals generated by the electrical signal generator (106) is within ±V with respect to time.

16. The surface scanning system of claim 1, wherein the voltage of the electrical signals generated by an x-axis electrical signal generator (202) is within ±V with respect to time.

17. The surface scanning system of claim 1, wherein the voltage of the electrical signals generated by a y-axis electrical signal generator (203) is within ±V with respect to time.

18. The surface scanning system according to claim 1, comprising the electrical signal generator (106) configured to generate an electrical signal at least one waveform selected from group consisting of: an electrical sinusoidal wave (501), a positive ramp sawtooth wave with a single duty cycle (502), a hybrid wave (503), an electrical triangle wave (701), a frequency-increasing positive-ramp sawtooth wave as a function of time (702), an up-chirp triangle wave (703), a frequency-increasing sinusoidal wave with a 90-degree phase shift (901), and a frequency-modulated triangle wave (902).

19. The surface scanning system according to claim 18, wherein the electrical signal generated by the electrical signal generator (106) is in the hybrid wave (503) form.

20. A surface scanning method in which a wide and dynamic interscan time interval is generated to be used in a point imaging process of surface scanning patterns, the method comprising the steps of:

a. driving a scanning mirror (103) or two-dimensional scanning mirror (201) by an electrical signal generator (106), which provides electrical signal in a hybrid wave (503) form depending on varying a direct current (DC) offset voltage of an electrical sinusoidal wave (501) linearly in time as a function of a positive ramp sawtooth wave with a single duty cycle (502) or as a function of the electrical signal in the ramp waveform, b. creating bidirectional and unidirectional surface scans on any axis of a target surface (105) or a combination of an x-axis and y-axis with a light or light beam (102) directed by the scanning mirror (103) or the two-dimensional scanning mirror (201) driven by the electrical signal generator (106).

21. The surface scanning method according to claim 20, wherein the method comprises the steps of:

a. driving the scanning mirror (103) or the two-dimensional scanning mirror (201) with the electrical signal generator (106) that provides electrical signals in a form of up-chirp triangle wave (703), b. creating bidirectional and unidirectional surface scans on any axis of the target surface (105) or a combination of the x-axis and γ-axis with the light or light beam (102) directed by the scanning mirror (103) or the two-dimensional scanning mirror (201) driven by the electrical signal generator (106).

22. The surface scanning method according to claim 20, wherein the method comprises the steps of:

a. driving the scanning mirror (103) or the two-dimensional scanning mirror (201) with an electrical signal generator (106) that provides electrical signals in a form of a frequency-modulated triangle wave (902) obtained by frequency deviation from linear frequency increase or linear frequency decrease as a function of time, b. creating bidirectional and unidirectional surface scans on any axis of the target surface (105) or a combination of the x-axis and y-axis with the light or light beam (102) directed by the scanning mirror (103) or the two-dimensional scanning mirror (201) driven by the electrical signal generator (106).

23. The surface scanning method according to claim 20, wherein electrical signals are analog or digital.

24. A surface scanning method for generating wide and dynamic time intervals between surface scans, wherein the method comprises one of the following surface scan patterns/protocols:

Hybrid waveform-based surface scan pattern/protocol, comprising:

generating a hybrid wave by varying a direct current (DC) offset voltage of an electrical sinusoidal signal linearly in time as a function of a positive ramp sawtooth waveform, shifting an instantaneous voltage of the electrical sinusoidal signal in time relative to an amplitude of an electrical ramp waveform while maintaining a constant peak-to-peak voltage, equalizing a varying speed of the DC offset voltage to a repetition rate of the electrical ramp waveform, and driving one of: a one-dimensional scanner for B-scanning along an x-axis and a z-axis consisting of a series of A-scans, or a two-dimensional scanner for C-scanning along x-, y-, and z-axes comprising a series of B-scans, Chirped waveform-based surface scan pattern/protocol, comprising:

generating an up-chirp triangle waveform by increasing frequency as a function of time using a positive ramp sawtooth waveform, generating a down-chirp triangle waveform by decreasing frequency as a function of time using a negative ramp sawtooth waveform, defining a width of time intervals between scans based on sweeping range dynamically defining variation in time intervals based on frequency change rate, and driving one of: a one-dimensional scanner for B-scanning, or a two-dimensional scanner for C-scanning, Frequency-modulated waveform-based surface scan pattern/protocol, comprising:

generating a frequency modulated triangle waveform by modulating an electrical triangle waveform using frequency deviation as a function of time in a 90-degree phase shifted sinusoidal form, defining a width of time intervals between scans by a deviation range of a peak frequency, dynamically defining a variation of a time interval between scans by a modulation rate, dynamically defining variation in time intervals based on modulation rate, and driving one of: a one-dimensional scanner for B-scanning, or a two-dimensional scanner for C-scanning.

25. The surface scanning method according to claim 24, wherein the scan pattern/protocol comprises the step of increasing a number of duty cycles for multiple scans based on the hybrid waveform or an up-chirp or down-chirp waveform or frequency-modulated waveform.

26. The surface scanning method according to claim 24, wherein:

surface scanning is used to acquire data and create images, alternatively, surface scanning is employed to provide therapeutic photo-thermal damage, including ablation and coagulation.

27. The surface scanning method according to claim 26, further comprising the process steps of, transmission of continuous-wave light or pulsed light from a light source to an optical collimator, reflecting the collimated light into a focusing lens via a two-dimensional scanning mirror, driving the two-dimensional scanning mirror with hybrid waveform or up-chirp waveform or down-chirp waveform or frequency-modulated waveform based electrical signals provided by electrical signal generators, focusing the collimated light at different spots on a target surface over a wide and dynamic time interval between surface B-scans or C-scans, transmitting a backscattered light collected from a sample through a same optical path.

28. The surface scanning method according to claim 24, wherein B-scan and C-scan comprise bidirectional scan or unidirectional scan.

29. A surface scanning system configured to perform the method of claim 24, wherein a two-mirror configuration comprises a light source, a collimator, two one-dimensional scanning mirrors, two electrical signal generators, and a focusing lens.

30. The surface scanning system which performs the method according to claim 24, wherein a single-mirror configuration comprises a light source, a collimator, a two-dimensional scanning mirror, two electrical signal generators, and a focusing lens.

31. The surface scanning system according to claim 29 or claim 30, wherein the light source comprises a high-power monolithic diode laser with an internal grating, a high-power broadband semiconductor optical amplifier with an internal grating, a diode driver including an on-board TEC controller, a dispersion-tuned swept-wavelength laser source, or a MEMS-VCSEL swept-wavelength laser source.

32. The surface scanning system according to claim 29 or claim 30, wherein the scanning mirror comprises, a galvo scanning mirror, resonance scanning mirror, or micro-electromechanical systems (MEMS) based scanning mirror.

33. The surface scanning system according to claim 29 or claim 30, wherein the focusing lens comprises a wide optical angle scanning lens.

34. The surface scanning system according to claim 29 or claim 30, wherein the electrical signals are analog or digital.

35. The surface scanning system according to claim 29 or claim 30, wherein the electrical signal generator comprises an RF-signal generator, a function generator, a random bit generator, a bit pattern generator, or a programmable bit pattern generator.

36. The surface scanning method of operating the system of claim 24, wherein the method is performed using a two-mirror configuration comprising a light source, an optical collimator, two cascaded one-dimensional scanning mirrors, electrical signal generators, and a focusing lens, the method comprising, transmission of continuous-wave light or pulsed light from a light source to an optical collimator, cascading one-dimensional scanning mirrors for the x-axis and y-axis, reflecting a collimated light into a focusing lens via cascaded two one-dimensional scanning mirrors, driving one-dimensional scanning mirrors with hybrid waveform or up-chirp waveform or down-chirp waveform or frequency-modulated waveform based electrical signals provided by electrical signal generators, focusing the collimated light at different spots on a target surface over a wide and dynamic time interval between surface B-scans or C-scans, transmitting a backscattered light collected from a sample through a same optical path.

* * * * *